April 26, 1955
H. KAHAN
2,707,023
STOP DEVICE FOR ROLLABLE SHADER AND BLINDS
Filed April 17, 1952
2 Sheets-Sheet 1
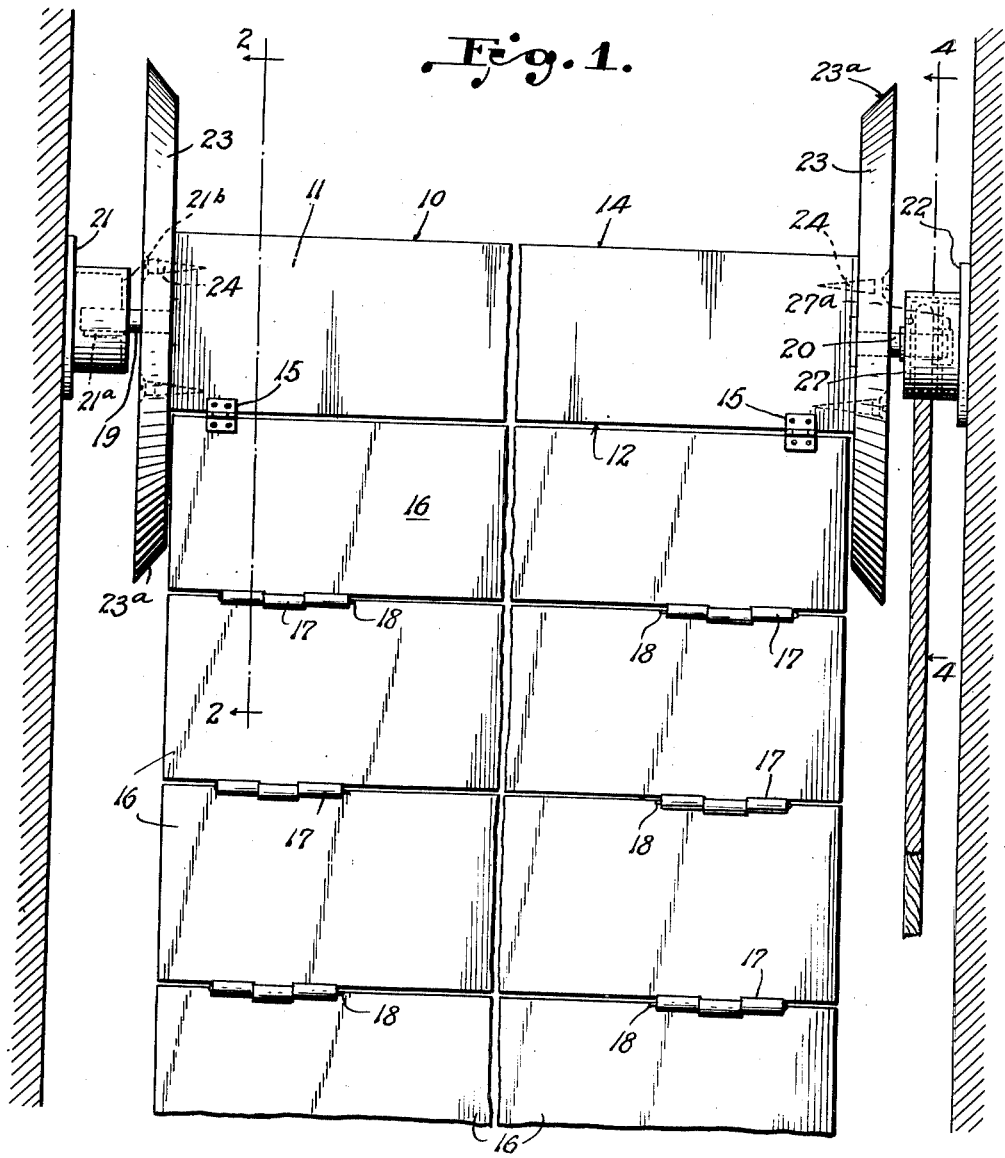
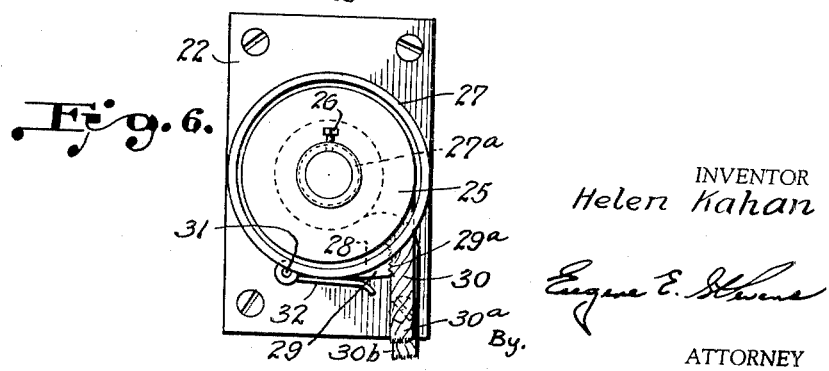
INVENTOR
Helen Kahan
ATTORNEY April 26, 1955
H. KAHAN
2,707,023
STOP DEVICE FOR ROLLABLE SHADER AND BLINDS
Filed April 17, 1952
2 Sheets-Sheet 2
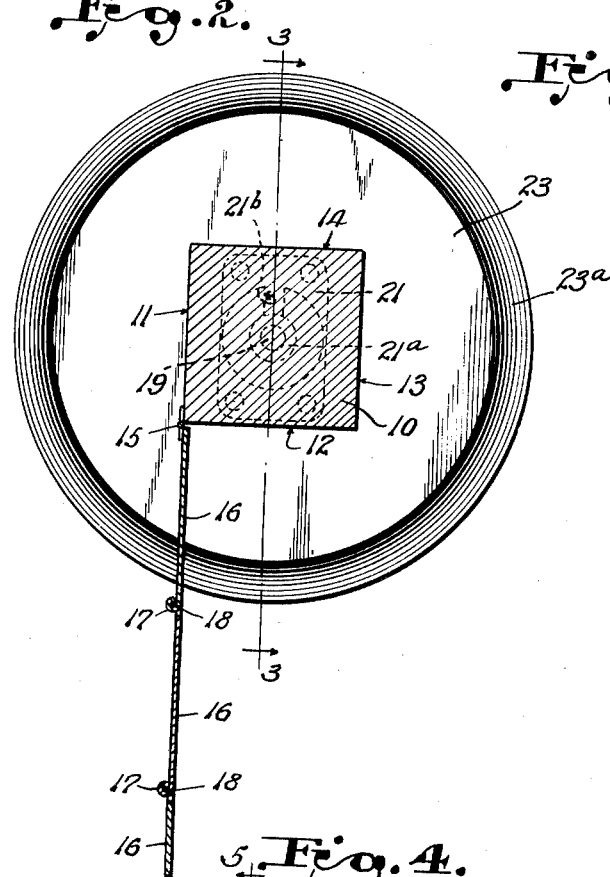
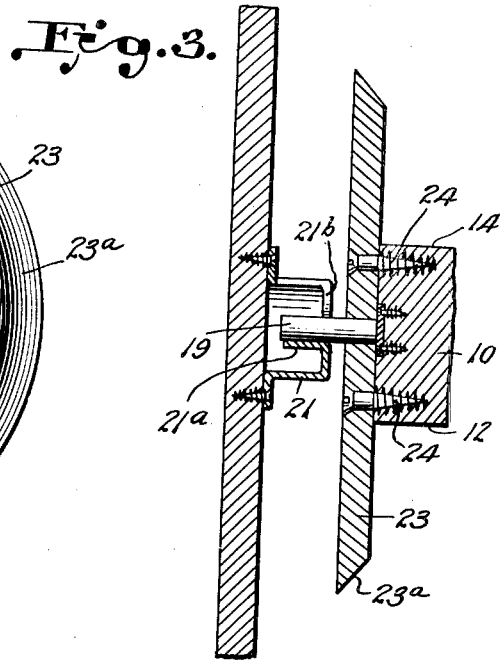
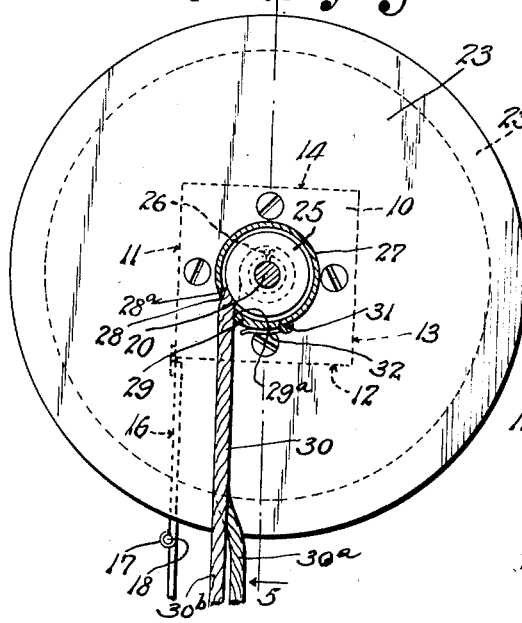
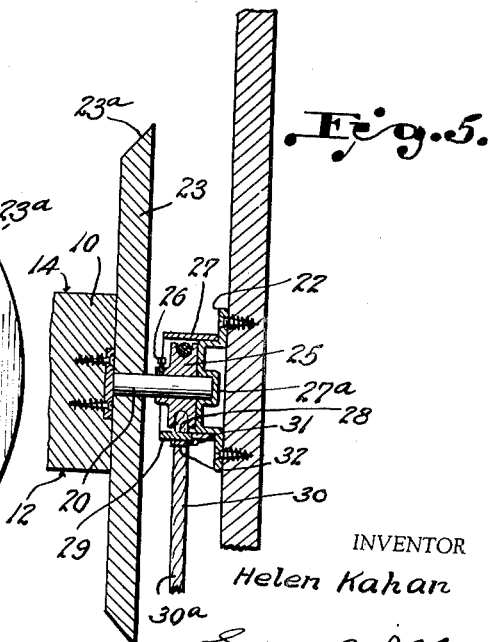
INVENTOR
Helen Kahan
BY
ATTORNEY

United States Patent Office 2,707,023
Patented Apr. 26, 1955

2,707,023

STOP DEVICE FOR ROLLABLE SHADES AND BLINDS

Helen Kahan, Fall River, Mass.

Application April 17, 1952, Serial No. 282,738

2 Claims. (Cl. 160—300)

My invention relates to improvements in slat-form blinds, shades or the like, although in its broader aspects it is not to be understood as limited thereto.

Briefly and generally stated, the invention in one of its phases aims to provide a slat-form blind or the like which is carried by a reel and wherein means is provided for assuring of neat disposition of the slats in flat contact with one another when the shade has been reeled onto its reel-support.

It is also an object of the invention to provide in a shade reel or the like means for preventing endwise shifting of the reeled up shade whether the latter be of slat-form or otherwise.

Another phase of the invention has to do with the support and control of the reel of a slat-form or other shade whereby the reel can be conveniently operated by means of pull cords and retained in different positions so as to retain the shade lowered to the degree desired.

Additionally, it is an object of the invention to provide operating means for a reel including a pulley on the pintle thereof and wall bracket-carried guard means for preventing dislodgement of a cord or the like from the pulley groove, such guard means embodying means acting against the pulley cord to retain the reel against movement except when the cord is pulled.

Other objects and advantages of the invention will be understood and appreciated by those versed in the art upon reference to the accompanying drawings which illustrate a preferred form of the invention. However, it is to be understood that the invention is susceptible of other mechanical expressions within the spirit and scope of the subject matter claimed hereinafter.

In the drawings, wherein the same reference characters have been used to designate the same parts throughout the several views—

Fig. 1 is a front elevational view partly broken and showing a slat-form shade or blind and its supporting reel;

Fig. 2 is a cross-sectional view through the reel, taken on the line 2—2 of Fig. 1;

Fig. 3 is a sectional detail taken on the line 3—3 of Fig. 2;

Fig. 4 is a cross-sectional view taken on the line 4—4 of Fig. 1, and showing the reel-operating and position control means;

Fig. 5 is a sectional view taken on the line 5—5 of Fig. 4;

Fig. 6 is an end view of the bracket member shown in Fig. 5.

Referring to the drawings by reference characters, numeral 10 designates the reel which as shown is rectangular in cross-section and provides the longitudinally coextensive flat sides 11, 12, 13, 14.

In carrying out the invention, the upper one of a series of slats 16 is hinged as at 15 to the face or side 11 of the reel 10 at the intersection of said side 11 with the side 12. Figs. 1 and 2 show that the slats 16 are hingedly connected to one another by pivot pins 18 which extend lineally through interfitting bearing portions 17 formed at the respective top and bottom longitudinal edges of adjacent slats 16.

It is to be noted that successive slats 16 from the top one to the bottom one are wider than the next preceding slat by a distance equal to the width of the bearing portions 17. In this connection it is to be noted that the reel surface 12 which receives the top slat 16 is of a width less than the width of the top slat by a distance approximating the width of the bearings 17 at the lower edge of said top slat. The succeeding surfaces 13, 14, 11 of the reel 10 bear the same relation to the width of the second, third and fourth slats of the series. Thus, when the shade is reeled up onto the reel there will be a flat stack of slats 16 disposed upon each of the surfaces 11, 12, 13, 14 of the reel 10. In other words, the bearing portions 17 of a reeled up slat 16 will project outwardly into plane with the surface of the reel or slat which is next to be covered by a slat being reeled up.

If desired, the lowermost slat of the series can be weighted so as to prevent the shade from blowing when down or partially down.

As to the matter of mounting the reel 10, Figs. 1 and 3 show that the lefthand end of the reel as viewed in Fig. 1 has the outwardly projecting concentric pintle 19 which is received in the bearing portion 21a of a bracket 21. Access to the bearing portion 21a is had through the vertical slot 21b indicated in Fig. 1.

The right-hand end of the reel 10 as viewed in Fig. 1 has the concentric outwardly projecting pintle 20 which is received in the bearing portion 27a of the cup-form portion 27 of the wall-carried bracket 22. Further reference will be made presently to the cup-form portion 27 of the bracket 22.

When the shade or blind is rolled up onto the reel 10 there is a tendency particularly if the pivot pins 18 are loose in the slat bearings 17 for the slats to move longitudinally. Accordingly, I preferably provide the ends of the reel 10 with guard disks 23 having inwardly bevelled portions 23a adjacent their peripheries so as to deflect the flats inwardly as the shade is reeled up. The guard disks 23 are secured by screws 24 or otherwise to the end surfaces of the reel 10.

Taking up now the matter of the means for controlling movement of the reel 10 to raise or lower the shade or blind 16, 16, etc., it will be noted from Fig. 5 that the pintle 20 of the reel 10 has fast thereon the pulley 25. The hub of the pulley carries a set screw 26 or the like for securing it fast on the pintle 20. Fig. 5 also shows the cord or other flexible connection 30 trained about the pulley 25 and having the depending ends 30a, 30b which project through the gap 28 in the bracket flange 27 which closely overlies the periphery of pulley 25.

The cup-provided flange 27 of bracket 22 by closely overlying the periphery of the pulley 25 serves to retain the cord 30 in the pulley groove. However, flange 27 has the further very important function of cooperating in retaining the cord ends 30a, 30b against movement and consequently the pulley 25 and reel 10 against turning as will now be explained.

Referring to Figs. 4 and 6, it will be noted that the inner end of the gap 28 through which the cord ends 30a, 30b pass has pivoted thereto as at 31 the rear end of a gripper jaw 29. The outer free end of the gripper jaw 29 is serrated as indicated at 29a and is urged against the remote end 28a of the gap 28 by means of a leaf spring 32 which is secured to flange 27 at the pivot 31. Thus, the jaw member 29 is normally urged by the spring 32 to grip the cord ends 30a, 30b against the end 28a of the flange gap and thus retain the cord 30 against movement to maintain the reel 10 stationary. However, it will be obvious that when either one of the cord ends 30a, 30b is pulled (depending upon whether it is desired to raise or lower the blind or shade) the jaw member 29 will be swung outwardly so as to permit of free movement of both cord ends 30a, 30b.

Thus, it will be evident that I provide a very simple control means for my reel 10, one which involves only one moving part (the jaw 29) aside from the pulley and the cord 30.

If desired, the ends 30a, 30b of the cord 30 can be connected so as to form a loop hanging about midway the height of the window or other opening in which the shade may be installed. Or the cord ends 30a, 30b can be of different colors so as to indicate which is the one for elevating the shade and which is the one for lowering the shade.

The cord 30 can be impregnated with friction material if desired, and for that matter, the groove of the pintle 25 may be friction lined, so as to avoid any possibility of the cord 30 slipping owing to weight of the partially lowered blind.

From the foregoing, it is believed that the invention will be readily understood without further discussion.

Having thus described my invention, what I claim is:

1. Mounting and control means for the pintle-ended carrier reel of a slat-form shade or the like, and comprising bracket-provided bearings for the pintle ends of said reel, a pulley fast on the pintle at one end of said reel, a flexible operating element trained over said pulley and having depending ends, bracket-carried guard means disposed over and closely adjacent to the periphery of said pulley at at least circumferentially spaced points for retaining the flexible operating element in the pulley groove, said guard means providing a gap through which said depending ends of said flexible operating element extend, an outwardly swingable gripping jaw pivoted to said guard at one end of said guard gap, spring means normally acting upon said gripping jaw to cause the free end of said jaw to bear against the depending ends of said flexible operating element to impinge the same against said guard at the other end of said gap whereby to retain said reel against rotation, said jaw being swung outwardly by pulling movement on either one of said flexible element ends whereby to admit of movement of both of the same.

2. The combination set forth in claim 1, and said guard means comprising an outwardly projecting collar disposed concentrically about said pintle receiving bearing of said bracket.

References Cited in the file of this patent

UNITED STATES PATENTS

| | | |
|---|---|---|
| 843,889 | Gilman | Feb. 12, 1907 |
| 1,232,927 | Johnston | July 10, 1917 |
| 1,472,221 | Jones | Oct. 30, 1923 |
| 1,720,850 | Negrini | July 16, 1929 |
| 1,744,682 | Cordsen | Jan. 21, 1930 |
| 1,876,750 | Reed | Sept. 13, 1932 |
| 2,413,471 | Sorrentino | Dec. 31, 1946 |
| 2,445,452 | Peed | July 20, 1948 |
| 2,564,197 | Dobkin | Aug. 14, 1951 |
| 2,569,599 | Cole | Oct. 2, 1951 |